Feb. 16, 1926.
R. E. HELLMUND
1,572,927
CONTROL APPARATUS
Filed Oct. 2, 1919
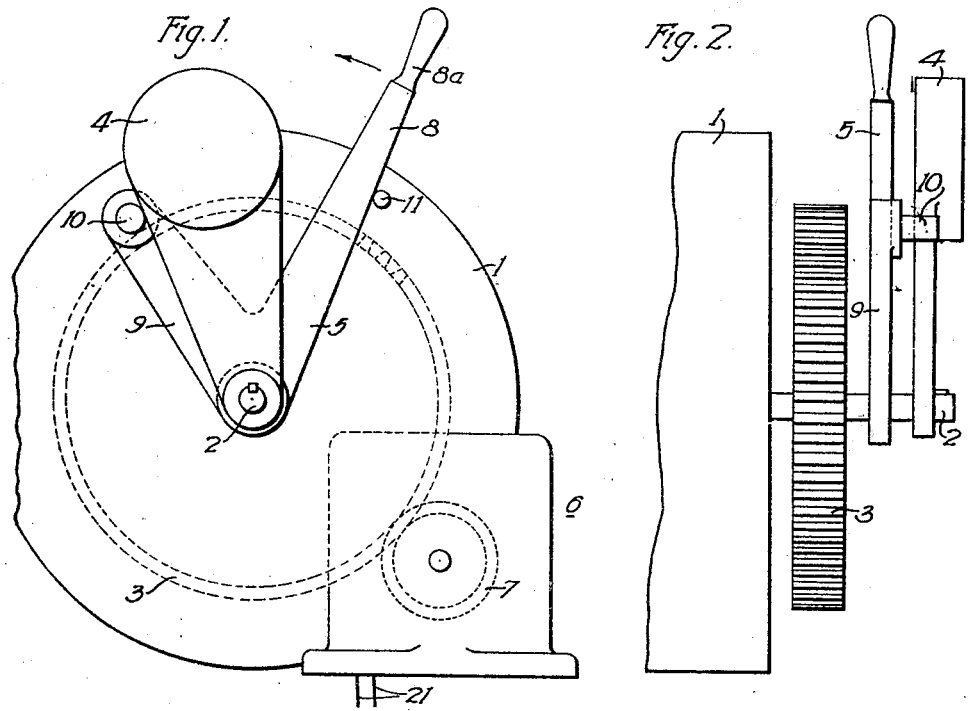
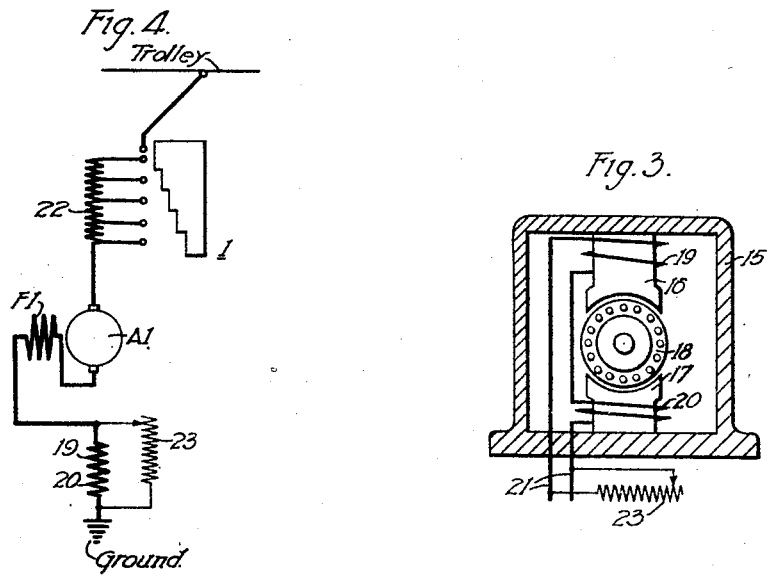
WITNESSES:
Geo. D. Barrett
W. P. Coley
INVENTOR
Rudolf E. Hellmund.
BY
Wesley G. Carr
ATTORNEY Patented Feb. 16, 1926.

1,572,927

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

CONTROL APPARATUS.

Application filed October 2, 1919. Serial No. 327,934.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Apparatus, of which the following is a specification.

My invention relates to control apparatus and particularly to controllers of the drum type, or the like, for governing the automatic acceleration of electric motors.

One object of my invention is to provide a controller of the above-indicated character which shall be biased toward an operative position by some energy-storing means, such as a weight, the rotative speed of the controller being governed by an induction brake.

Another object of my invention is to provide a controlling device of the type just set forth, wherein the induction brake is energized in accordance with the load of the motor or the translating device to be governed, whereby the acceleration thereof will be automatically controlled.

Other minor objects of my invention will become evident from the following detailed description, taken in conjunction with the accompanying drawing, wherein—

Figure 1 is a view, in end elevation, of a control apparatus constructed in accordance with the present invention;

Fig. 2 is a partial view, in side elevation, of the structure shown in Fig. 1;

Fig. 3 is a sectional view of one form of induction brake that may be employed in my invention; and Fig. 4 is a diagrammatic view of a system of control to which the invention is applied.

Referring to Fig. 1 and Fig. 2 of the drawings, the structure here shown comprises a control drum 1, or the like, having an operating shaft 2 to which are rigidly secured a gear-wheel 3 and a weighted member 4, while an operating handle 5 is loosely mounted on the shaft. An induction brake 6 is provided with a pinion 7 that meshes with the gear-wheel 3.

Although the invention is shown as applied to a control drum 1, it will be understood that the application of my invention is not so restricted and that any suitable type of rotatable control member, such as a cam-shaft or a face-plate, may be employed in conjunction with my present invention, if desired. Furthermore, the use of the weighted member 4 is not essential, and any equivalent energy-storing device, such as a spring, or a fluid-pressure-operated member, may be employed.

The handle member 5 comprises a main arm 8, to which the customary grip 8a is secured, and a projection or smaller arm 9 to which is attached a transversely-extending pin 10. The controller is illustrated in its "off" position, wherein the weighted member 4 assumes an inclined position to the left of the vertical, while the arm 8 of the handle member 5 occupies its extreme right-hand position, resting against a suitable stop member 11. The weighted member 4 is restrained in the position shown by means of the pin 10 on the handle member 5, the proportion and position of parts being such that a condition of stable equilibrium obtains when the controller occupies its "off" or neutral position.

The induction brake 6 may be of any suitable form and is here shown as comprising a casing or frame 15 for enclosing a plurality of oppositely located polar projections 16 and 17, and a rotor 18 which may comprise either a small metal cylinder or a simple squirrel-cage rotor. A plurality of field coils 19 and 20 are suitably wound around the polar projections 16 and 17, and terminals or leads 21 are brought out from one side of the induction brake 6.

The mechanical operation of the illustrated apparatus may be set forth as follows: whenever grip 8a is actuated in the direction indicated by the arrow, the pin 10 is disengaged from the weighted member 4, which thus becomes free to effect a rotative movement of the control drum towards the position corresponding to a vertically-suspended location of the weighted member. However, such movement of the control drum may be arrested at any desired notch or position by merely holding the handle member 5 in a corresponding location, whereby the pin 10 again engages the weighted member 4. Furthermore, under operative conditions, when the induction brake 6 is energized, the mechanical connection thereof with the control drum, through the meshing gear-wheels 3 and 7, imposes a retarding action upon the impelling weight 4.

The preferred character of energization of the induction brake 6 is illustrated in Fig. 4, wherein the system shown comprises supply conductors trolley and ground, an electric motor having an armature A1 and a field-winding F1, together with the controller 1 for regulating the active amount of an accelerating resistor 22, and the field coils 19 and 20 of the induction brake, which are connected in series relation with the electric motor to be governed. The induction brake is thus energized in accordance with the load or the current traversing the electric motor or other translating device to be controlled. Consequently, under heavy-load conditions, the control drum 1 will move at a relatively slow rate, while, under light-load conditions, the drum will be actuated at a comparatively rapid speed. In this way, a desirable automatic control of the motor or the translating device to be governed is effected.

The proper relation between the drum speed and the motor load may be readily governed by a suitable design of the induction brake to provide the proper degree of magnetic saturation, or, preferably, a variable resistor 23 may be connected across the field coils 19 and 20, the proportion of current shunted being regulated in accordance with the desired average accelerating load.

While it is desirable to vary the braking action approximately in proportion to the load current, as determined by a fixed setting of the resistor 23, it is frequently a necessity to change the setting with the variable load conditions encountered. For example, on heavy-traffic trains, such as subway trains, the resistor may be advantageously decreased with increasing passenger load. In the case of trailer service, the resistor 23 may be decreased when a trailer is being hauled. Furthermore, the resistor may be decreased when the car is ascending a grade and increased when traveling down hill. For locomotive operation, the resistor may be made the smaller, the longer the train. With these adjustments, an unusually desirable type of automatic acceleration may be provided.

When it is desired to arrest movement of the motor, the handle member 5 is returned to the position illustrated in Fig. 1, and the pin 10 concurrently carries the weighted member 4 back to its initial position. The braking effect of the induction brake 7 is relatively small under these circumstances, since the motor current rapidly diminishes to a low value when the control drum 1 is moved backwards.

It will be seen that I have thus provided a relatively simple and inexpensive control apparatus whereby complete automatic acceleration of an electric motor in accordance with the load thereof may be effected, or notch-by-notch acceleration, at the will of the train operator, may be provided.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. Multi-position control apparatus comprising a rotatable shaft, means for biasing said shaft towards an operative position, an induction brake for governing the rotative speed of said shaft, and means loosely mounted on said shaft for releasing and checking the biasing means.

2. Multi-position control apparatus comprising a movable member, energy-storing means for actuating said member, an induction brake for opposing the movement of said member, and means loosely associated with said movable member for releasing and restraining said energy-storing means.

3. Multi-position control apparatus comprising a rotatable shaft, an energy-storing member tending to actuate said shaft; an induction brake for retarding the movement of the shaft, and a handle member loosely mounted on said shaft for releasing or restraining said energy-storing member at will.

4. Multi-position control apparatus comprising a rotatable shaft, an impelling weight and a gear-wheel secured to said shaft, an induction brake having a rotatable member meshing with said gear-wheel, and a handle member having a projection for restraining the impelling movement of said weight at will.

In testimony whereof, I have hereunto subscribed my name this 23rd day of Sept. 1919.

RUDOLF E. HELLMUND.